July 19, 1949.    W. H. KLIEVER    2,476,496
CONDITION REGULATING APPARATUS
Filed July 14, 1944
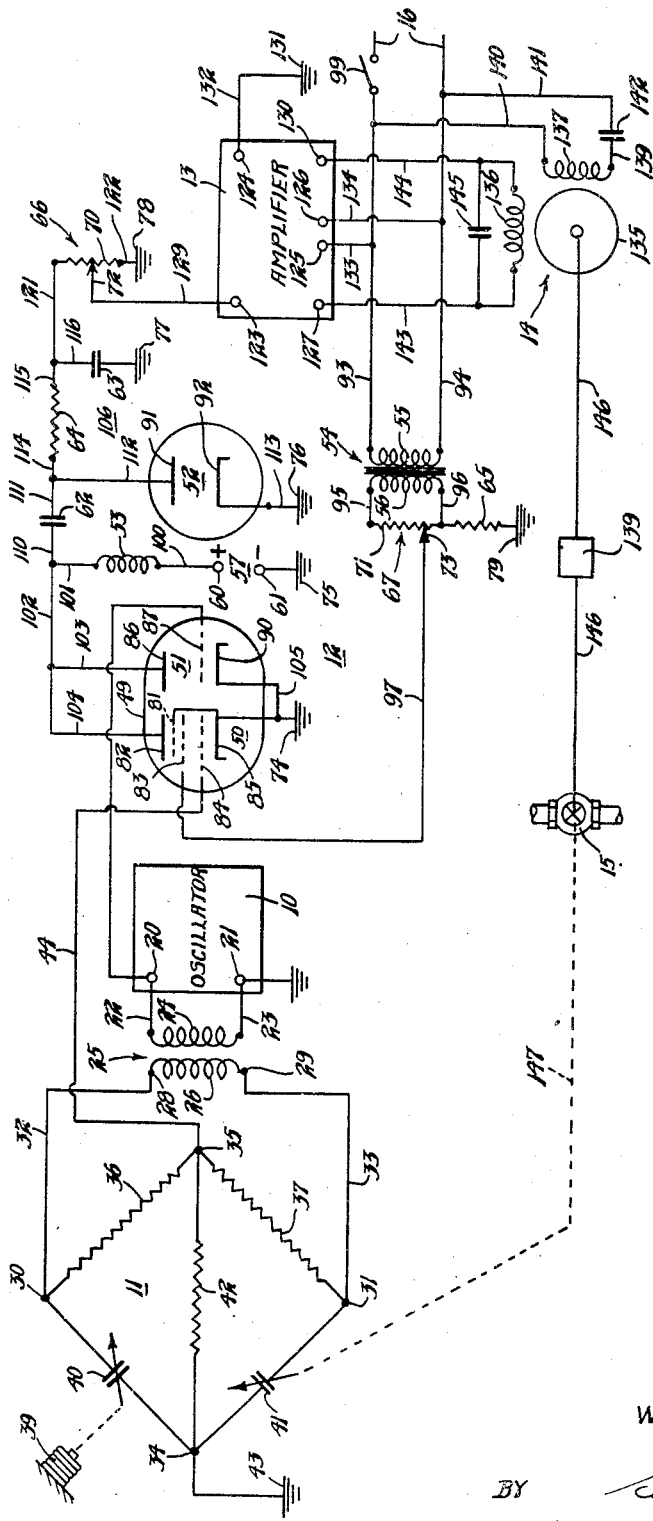
INVENTOR
WALDO H. KLIEVER
BY George H. Fisher
ATTORNEY Patented July 19, 1949

2,476,496

UNITED STATES PATENT OFFICE 2,476,496

CONDITION REGULATING APPARATUS

Waldo H. Kliever, Minneapolis, Minn., assignor to Minneapolis-Honeywell Regulator Company, Minneapolis, Minn., a corporation of Delaware Application July 14, 1944, Serial No. 546,191

20 Claims. (Cl. 318—29)

My present invention relates to the field of electrical control systems, and more particularly to systems for regulating a condition by responsively controlling the rate and direction of operation of an electric motor whose operation is effective to vary the condition. It is accordingly an object of my invention to provide a novel and useful electrical system.

It is an object of my invention to provide a new and improved condition controlling system.

It is also an object of my invention to provide a new and improved motor control system, in which the operation of a motor of substantial power is regulated by a condition responsive means having negligible power.

It is another object of my invention to provide means reversibly energizing a low frequency motor upon reversal of the phase of a high frequency signal.

It is yet another object of my invention to provide electrical means for obtaining a low frequency output voltage which varies in amplitude and reverses in phase with amplitude variation and phase reversal in a high frequency signal voltage.

It is a further object of my invention to provide a system for reversibly controlling a low frequency motor according to reversible unbalance of a high frequency electrical bridge.

It is a still further object of my invention to provide electronic means deriving a phase reversing low frequency alternating voltage from a fixed phase low frequency voltage, a fixed phase high frequency voltage, and a phase reversing high frequency voltage.

Various other objects, advantages and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

The single figure of the drawing is a schematic showing of my system and its component parts, illustrating the operative relationship between the various elements and the method of connecting them in the completed circuit.

Referring now to the drawing, it will be seen that my invention is made up of a number of principal components including a condition responsive member 39, an oscillator 10, a bridge 11, an electronic circuit 12, an amplifier 13, and a motor 14 actuating a condition regulating member 15, all suitably connected together for performing the functions of the invention. Oscillator 10 acts as a source of alternating voltage of high frequency, a convenient frequency in the range conventionally used for carrier service in radio communication for this oscillator being 100 kilocycles per second, while alternating voltage of power frequency, which may, for example, be 60 cycles per second, is obtained from any suitable source indicated by numeral 16.

Oscillator 10 is a radio frequency oscillator of conventional construction, and may be provided with electrical energy from any suitable source, such as batteries, for example. The oscillator is provided with output terminals 20 and 21 to which are connected, by conductors 22 and 23, the primary winding 24 of a radio frequency transformer 25 having a secondary winding 26. Bridge 11 is provided with a pair of input terminals 30 and 31, which are connected to winding 26 of transformer 25 by conductors 32 and 33, and a pair of output terminals 34 and 35, the former being grounded as at 43.

Bridge 11 also includes a pair of fixed resistors 36 and 37, a pair of variable capacitors 40 and 41, and a load resistor 42. Resistor 36 is connected between input terminal 30 and output terminal 35. Resistor 37 is connected between input terminal 31 and output terminal 35. Variable capacitor 40 is connected between input terminal 30 and output terminal 34. Variable capacitor 41 is connected between input terminal 31 and output terminal 34, and is arranged for adjustment in capacitance by condition responsive member 39. Load resistor 42 is connected between output terminals 34 and 35. Output terminal 35 is connected with electronic circuit 12 by conductor 44.

It will be apparent that resistors 36 and 37 comprise adjacent arms of the bridge, and that variable capacitors 40 and 41 also comprise adjacent arms of the bridge. The resistances of resistors 36 and 37 may have any desired ratio, but I prefer to make them equal: if the impedances of capacitors 40 and 41 have the same ratio, that is, are equal, the bridge is balanced. This means that the voltage drop between terminal 30 and terminal 35 is equal in magnitude to the voltage drop between terminal 30 and terminal 34 and there is therefore no voltage between terminals 34 and 35. Resistors 36 and 37 can be replaced by other members, for example, inductances, as long as the impedance ratio is unaltered.

I have shown capacitors 40 and 41 as being adjustable. The capacitance of capacitor 40 changes in accordance with change in a condition to be observed. This may be due for example, to change in the dielectric constant of the medium between the condenser plates as in measuring the dielectric constant of a fluid, but in the preferred embodiment of my invention, I have shown it as being brought about by mechanical movement between the plates in response to the expansion of a bellows 39 due to a rise in temperature alternatively, such a condition responsive capacitor pick-up may be used as that disclosed in Patent No. 2,303,654, issued December 1, 1942. With a change in the capacitance of capacitor 40, its impedance also changes, and the voltage drop between terminals 30 and 34 of bridge 11 is no longer the same as that between terminals 30 and 35. An alternating voltage having the frequency of the oscillator therefore appears across load resistor 42 between terminals 34 and 35; this voltage is in phase or 180° out of phase with that between terminals 28 and 29 of winding 26 depending on whether the impedance of capacitor 40 increases or decreases.

Electronic circuit 12 comprises a plurality of electron discharge devices including a pentode 50 and a triode 51, and a diode 52 comprised in a single tube 49: individual tubes may be used instead of the multi-purpose tube if desired. The circuit also includes an impedance 53 which may be a radio frequency choke, a transformer 54 having a primary winding 55 and a secondary winding 56, a source 57 of unidirectional voltage having a positive terminal 60 and a negative terminal 61, a pair of capacitors 62 and 63, a pair of resistors 64 and 65, and a pair of potential dividers 66 and 67, the latter comprising resistance windings 70 and 71 and movable contact arms 72 and 73, both respectively. The circuit further includes a number of ground connections 74, 75, 76, 77, 78, and 79.

Pentode 50 comprises an anode 82, a suppressor grid 81, a screen grid 83, a control grid 84, and a cathode 85. Triode 51 comprises an anode 86, a control grid 87, and a cathode 90. Diode 52 comprises an anode 91, and a cathode 92. It will be readily understood that the cathodes of these electron discharge devices are indirectly heated in the conventional fashion by heating filaments which are not shown. It will also be obvious that a tetrode may be used instead of a pentode, by making the appropriate conventional circuit changes.

Electrical energy is transmitted from low frequency source 16 through conductors 93 and 94 to primary winding 55 of transformer 54. A switch 99 is provided to interrupt the supply of electrical energy. Secondary winding 56 of transformer 54 is connected to the winding 71 of potential divider 67 by conductors 95 and 96, and one terminal of winding 71 is grounded as at 79 through resistor 65. Sliding contact 73 of potential divider 67 is connected with screen grid 83 of pentode 50 by conductor 97.

Cathodes 85 and 90 of pentode 50 and triode 51 are joined together by conductor 105 and grounded at 74. The negative terminal 61 of voltage supply 57 is grounded as at 75, and its positive terminal 60 is connected to plates 82 and 86 of pentode 50 and triode 51 by conductor 100, choke 53, conductor 101, conductor 102, and conductors 103 and 104. The plates are maintained at all times positive with respect to their cathodes.

It will thus be apparent: that an alternating voltage is impressed between the control grid of pentode 50 and its cathode whose magnitude varies with unbalance of bridge 11 and whose frequency is that of oscillator 10; that a second alternating voltage is impressed between the screen grid and cathode of pentode 50, whose magnitude is determined by the position of slider 73 along winding 61 and whose frequency is that of source 16; and that a third alternating voltage is impressed between control grid 87 and cathode 90 of triode 51 which is of the frequency and magnitude of the oscillator.

From the foregoing it follows that the plate current of pentode 50 flows through choke 53 producing a voltage drop thereacross, and similarly that the plate current of triode 51 produces an independent voltage drop across choke 53. The resulting voltage is transmitted by conductor 110, condenser 62, conductors 111 and 112, and through ground connections 75 and 76, and impressed between the anode 91 and cathode 92 of diode 52.

Diode 52 acts as a rectifier or diode detector, and is provided with an output filter circuit 106 including conductor 114, resistor 64, conductors 115 and 116, condenser 63 and ground connection 77. The output of the filter is connected as by conductor 121 so that it is impressed across the winding 70 of potential divider 66, whose other terminal is connected to ground at 78.

Amplifier 13 is shown as providing a pair of signal input terminals 123 and 124, a pair of power input terminals 125 and 126, and a pair of power output terminals 127 and 130. Input terminal 124 is grounded as at 131 by conductor 132, and input terminal 123 is connected with sliding contact 72 of potential divider 66 by conductor 129, so that the potential impressed across the input of amplifier 13 is determined by the position of slider 72 along winding 70.

Amplifier 13 may be of any suitable type. I prefer to use in this application the amplifier disclosed in application Serial No. 437,561, filed April 3, 1942, now Patent 2,423,534, issued July 8, 1947, in the name of Albert P. Upton, and assigned to the assignee of the present application, and for this reason I have shown power input terminals 125 and 126 connected with conductors 93 and 94 supplying alternating current from source 16 by conductors 133 and 134. It must be clearly understood, however, that I am not limited to use of such an amplifier, and that my invention will operate with perfect satisfaction with any other conventional type of amplifier in which the output of the amplifier is dependent upon the phase of the input voltage.

Motor 14 is shown to comprise a rotor 135 and a pair of field windings 136 and 137. Winding 137 is connected to conductors 93 and 94 by conductor 140, conductor 141, capacitor 142, and conductor 139. Winding 136 is connected to output terminals 127 and 130 of amplifier 13 by conductors 143 and 144: a capacitor 145 is connected in parallel with winding 136. An output shaft 146 is provided for rotatively mounting rotor 135, and to external portion of shaft 146 is connected any suitable control instrument 15. I have shown a gear reduction mechanism 139 between motor 14 and instrument 15: this can conveniently be constructed as a physical part of the motor. For the sake of illustration, I have shown instrument 15 to comprise a valve in the fuel line to a burner, but it will be appreciated that this can in fact comprise a damper actuating arm, or any equivalent device for performing a control or indicating function.

In certain applications, it is customary to provide a follow up arrangement between the motor driven in accordance with unbalance of a bridge and a member of the bridge, to provide for rebalancing the bridge independent of reverse change in the condition being regulated. To this end I have indicated a further mechanical connection 147, through instrument 15, between shaft 146 and variable capacitor 41. It will be realized, however, that in control systems of the floating type such a connection is not necessary.

By way of illustration only certain values of circuit elements which I have found to function satisfactorily in a preferred embodiment of my invention are listed herewith:

| | |
|---|---|
| Capacitor 40 | 20 micro-microfarads |
| Capacitor 41 | 20 micro-microfarads |
| Capacitor 62 | .0001 microfarads |
| Capacitor 63 | .0001 microfarads |
| Resistor 36 | .25 megohms |
| Resistor 37 | .25 megohms |
| Resistor 42 | .5 megohms |
| Resistor 64 | .1 megohms |
| Potentiometer 66 | .5 megohms |
| Potentiometer 67 | 50,000 ohms |
| Tube 49 | 6AD7G |
| Tube 52 | 6H6 |
| Choke 53 | 30 millihenries |
| Secondary voltage of transformer 54 | 120 volts |
| Output voltage of oscillator 10 | 50–100 volts |

*Operation*

Functionally, my invention operates as follows: So long as bridge 11 is in a balanced condition, operation of motor 14 does not take place in either direction. If bridge 11 is unbalanced in a first direction due to a decrease of the impedance of capacitor 40, operation of motor 14 is initiated in such a direction as to act through shafts 146 and 147 on variable capacitor 41 to decrease its impedance. Similarly, if bridge 11 is unbalanced in a second direction due to an increase in the impedance of capacitor 40, the resultant operation of motor 14 acts to increase the impedance of capacitor 41, thus again rebalancing the bridge. I conceive the explanation of this operation to be as follows.

Suppose the bridge to be unbalanced in the first direction. Then a potential difference is impressed between control grid 84 and cathode 85 of pentode 50, the magnitude of the voltage being determined by the degree of unbalance of bridge 11, and the phase depending upon the direction of unbalance of the bridge. In this case, since the impedance of capacitor 40 is assumed to have decreased, the signal potential between output terminals 35 and 34 is 180° out of phase with the input potential between terminals 30 and 31.

A second potential difference is impressed between screen grid 83 and cathode 85 of pentode 50 from potential divider 67: the amplitude of this voltage is determined by the setting of slider 73, and the frequency of this voltage is the frequency of source 16.

Plate 82 is constantly maintained at a positive potential with respect to cathode 85 by power supply 57; the flow of plate current through pentode 50 and therefore through impedance 53 is determined by the joint effect of control grid 84 and of screen grid 83. This plate current is a complex wave best described as a carrier frequency of 100 kilocycles, amplitude modulated at 60 cycles.

A potential difference is maintained between control grid 87 and cathode 90 of triode 51 from the output terminals 20 and 21 of oscillator 10. This signal potential is in phase with the potential impressed between control grid 84 and cathode 85 of pentode 50, since the latter has been twice reversed in phase, once in transformer 25 and once in bridge 11. Power supply 57 maintains a constant positive potential on plate 86 with respect to cathode 90, and the flow of current through triode 51 is therefore determined by the potential on control grid 87. This plate current also flows through impedance 53, and comprises a high frequency current which is in phase with the carrier current flowing through impedance 53 due to pentode 50.

The instantaneous voltage drop across impedance 53 is proportional to the algebraic sum of the modulated and unmodulated carrier currents through pentode 50 and triode 51.

If an amplitude modulated alternating current and an unmodulated current of the same frequency and of the same or smaller amplitude are added algebraically, the envelope of the resulting wave is in phase with the modulating wave if the two currents are in phase, as is well known to those skilled in the art, and the envelope and the modulating wave are opposite in phase if the two alternating currents are opposite in phase. Therefore the envelope of the current flowing through impedance 53 in the present case is in phase with the modulating current, which in turn is in phase with the voltage at transformer 54.

Condenser 62 completely blocks off any direct current from reaching the plate of rectifier tube 52, and also has a high impedance to voltages of the frequency of source 16. The potential across diode 52 is therefore that proportional to the summation just referred to, and in diode 52 rectification or demodulation takes place. Resistor 64 and condenser 63 combine to form a filter 106 effective to substantially remove the high frequency component of the demodulated current, leaving only the envelope which is a cyclic curve having the same period as the source 16 and of generally sinusoidal wave form. A desired portion of the output of the filter is selected by potential divider 66 and impressed across the input terminals of amplifier 13.

If an amplifier of the type disclosed in the application previously referred to is used, its operation is exactly as there set forth. Winding 137 of motor 14 is continuously energized from conductors 93 and 94, and due to the presence of condenser 142 in this line, the current flowing in winding 137 is constantly in quadrature with the voltage across conductors 93 and 94. Since the modulated voltage on the screen grid of pentode 50 is determined by the voltage across conductors 93 and 94, the current in winding 136 is also quadrature with this voltage. The amplifier therefore acts to energize winding 136 of motor 14 with current either in phase or 180° out of phase with the voltage between conductors 93 and 94, depending on whether the input voltage impressed between terminals 123 and 124 of the amplifier is in phase or out of phase with the potential between conductors 93 and 94. When the current through winding 136 leads the current through winding 137 by 90°, rotation of motor 14 in a first direction takes place, but when the current through winding 136 lags the current through winding 137, operation of motor 14 takes place in the opposite direction.

When the voltage between control grid 84 and cathode 85 of pentode 50 is of the same phase as the voltage between control grid 87 and cathode 90 of triode 51, the envelope of the demodulated signal transmitted through the filter is in phase with the potential between conductors 93 and 94, and in this case operation of motor 14 results in such a direction as to rotate shaft 146 so as to increase the impedance of capacitor 41. At the same time, rotation of shafts 146 and 147 causes a change in the setting of valve 15 of such a nature as to cause an increase in the temperature of the space in which member 39 is located.

When motor 14 has rotated through such a number of revolutions as to bring about a change in capacitor 41 equal to the change responsively caused in capacitor 40, the voltage between terminals 35 and 34 becomes zero, and therefore control grid 84 is at cathode potential as anode current through impedance 53 due to pentode 50 is no longer an amplitude modulated carrier, but simply a low frequency current, to which coupling condenser 62 offers very high impedance. No appreciable signal of the power frequency is therefore impressed between terminals 123 and 124 of amplifier 13, and operation of motor 14 is therefore interrupted.

If bridge 11 is unbalanced in the opposite direction by increase in the impedance of capacitor 40, the potential between terminals 35 and 34 is of the same phase as the potential between terminals 30 and 31, and therefore the potential between control grid 84 and cathode 85 of pentode 50 is 180° out of phase with the potential between control grid 87 and cathode 90 of triode 51. The current through impedance 53 due to pentode 50 is still a modulated carrier, but since the two high frequency currents are opposite in phase as just pointed out, the current through impedance 53 is reversed 180° in phase as compared with that in the former case. Energization of motor winding 136 therefore takes place in the same general manner, but in the opposite sense, and opposite rotation of motor 14 ensues, rebalancing bridge 11 by decreasing the impedance of variable capacitor 41.

It should be clearly borne in mind that my novel circuit may have utility apart from the control of a reversible alternating current motor, and that it is applicable for instance wherever it may be desired to drive a signal, of the nature of that impressed on the input terminals of amplifier 13, from such sources as low frequency source 16 and oscillator 10 under the control of a responsive member. My system has been particularly designed for use with capacity pick-up devices since the efficient use of such devices requires operation of the instrument at high frequency while the most efficient operation is to be obtained from dynamo electric machines at low frequency. However, my device will operate with equal success when controlled by a purely resistance bridge, or indeed by any impedance bridge, and it will with equal satisfaction control the operation of a direct current motor if the proper substitution of a conventional motor controlled amplifier is made.

Numerous objects and advantages of my invention have been set forth in the foregoing description together with details of the structure and function of the invention, and the novel features thereof are pointed out in the appended claims. The disclosure, however, is illustrative only, and I may make changes in detail, especially in matters of shape, size, and arrangement of parts within the principle of the invention to the full extent indicated by the broad general meaning of the terms in which the appended claims are expressed.

I claim as my invention:

1. In a device of the class described, in combination, a first source of alternating voltage of high frequency and fixed phase, means deriving therefrom a signal voltage of said high frequency and of reversible phase with respect thereto, a second source of alternating voltage of low frequency and fixed phase, means modulating said signal voltage at the frequency of said second source, means combining said modulated voltage with voltage from said first source, independent means demodulating said combined voltage, a reversible low frequency motor, and means connecting said demodulator and said second source in energizing relation with said motor.

2. In a device of the class described, a normally balanced impedance bridge, a first source of alternating voltage, of high frequency, means connecting said source with said bridge, means for causing unbalance of said bridge in response to change in a condition, means varying the impedance of an arm of said bridge for effecting rebalance of said bridge, said bridge giving a signal voltage of said high frequency when unbalanced, said signal voltage being in phase with the voltage of said source when said bridge is unbalanced in a first direction, the phase of said signal voltage reversing with reversal in the direction of said unbalance, an electron discharge device having anode, cathode and control elements, means connecting said elements in a plurality of input circuits and an output circuit, means impressing said signal voltage upon one of said input circuits, a second source of alternating voltage of a power frequency, means impressing, upon another of said input circuits, a second voltage of said power frequency and of a phase angle with respect to the voltage of said second source which is an integral multiple of 180 degrees, an output impedance member for said device, means connecting said member in said output circuit whereby discharge of said device through said member under the influence of said voltages impressed upon said input circuits may cause a voltage to appear across said member, said voltage being of said high frequency modulated by said power frequency to an extent determined by the unbalance of said bridge, means combining said voltage with a voltage from said first source, a demodulator, means impressing said combined voltage upon said demodulator, means deriving from said demodulator an output voltage of said power frequency when said bridge is unbalanced, said output voltage being in phase with the voltage of said second source when said bridge is unbalanced in a first direction, the phase of said output voltage reversing with reversal in the direction of said unbalance, a motor having windings rotatedly spaced 90 electrical degrees, means connecting one of said windings with said output voltage to provide reversible energization of said winding, means connecting a second of said windings with said second source to provide voltage for energizing said second winding, said last named means including means introducing a phase angle of 90 degrees between said energizing voltage and the voltage of said second source, whereby to cause reversible operation of said motor upon reversible unbalance of said bridge, control means mechanically actuated by said motor, and means mechanically connecting said motor and said rebalancing means, whereby operation of said motor actuated by said bridge unbalance may bring about rebalance of sid bridge.

3. In a device of the class described, a normally balanced impedance bridge, a first source of alternating voltage, of high frequency, means connecting said source with said bridge, means varying the impedance of an arm of said bridge for causing unbalance of said bridge, means varying the impedance of an arm of said bridge for effecting rebalance of said bridge, said bridge giving a signal voltage of said high frequency when unbalanced, said signal voltage being in phase with the voltage of said source when said bridge is unbalanced in a first direction, the phase of said signal voltage reversing with reversal in the direction of said unbalance, an electron discharge device having anode, cathode and control elements, means connecting said elements in a plurality of input circuits and an output circuit, means impressing said signal voltage upon one of said input circuits, a second source of alternating voltage of a power frequency, means impressing, upon another of said input circuits, a second voltage of said power frequency and of a phase angle with respect to the voltage of said second source which is an integral multiple of 180 degrees, an output impedance member for said device, means connecting said member in said output circuit whereby discharge of said device through said member under the influence of said voltages impressed upon said input circuits may cause a voltage to appear across said member, said voltage being of said high frequency modulated by said power frequency to an extent determined by the unbalance of said bridge, means combining said voltage with a voltage from said first source, a demodulator, means impressing said combined voltage upon said demodulator, means deriving from said demodulator an output voltage of said power frequency when said bridge is unbalanced, said output voltage being in phase with the voltage of said second source when said bridge is unbalanced in a first direction, the phase of said output voltage reversing with reversal in the direction of said unbalance, a motor having windings rotatedly spaced 90 electrical degrees, means connecting one of said windings with said output voltage to provide reversible energization of said winding, means connecting a second of said windings with said second source to provide voltage for energizing said second winding, said last named means including means introducing a phase angle of 90 degrees between said energizing voltage and the voltage of said second source, whereby to cause reversible operation of said motor upon reversible unbalance of said bridge, control means mechanically actuated by said motor, and means mechanically connecting said motor and said rebalancing means, whereby operation of said motor actuated by said bridge unbalance may bring about rebalance of said bridge.

4. In a device of the class described, a normally balanced impedance bridge, a first source of alternating voltage, of high frequency, means connecting said source with said bridge, means for causing unbalance of said bridge in response to change in a condition, said bridge giving a signal voltage of said high frequency when unbalanced, said signal voltage being in phase with the voltage of said source when said bridge is unbalanced in a first direction, the phase of said signal voltage reversing with reversal in the direction of said unbalance, an electron discharge device having anode, cathode and control elements, means connecting said elements in a plurality of input circuits and an output circuit, means impressing said signal voltage upon one of said input circuits, a second source of alternating voltage of a power frequency, means impressing, upon another of said input circuits, a second voltage of said power frequency and of a phase angle with respect to the voltage of said second source which is an integral multiple of 180 degrees, an output impedance member for said device, means connecting said member in said output circuit whereby discharge of said device through said member under the influence of said voltages impressed upon said input circuits may cause a voltage to appear across said member, said voltage being of said high frequency modulated by said power frequency to an extent determined by the unbalance of said bridge, means combining said voltage with a voltage from said first source, a demodulator, means impressing said combined voltage upon said demodulator, means deriving from said demodulator an output voltage of said power frequency when said bridge is unbalanced, said output voltage being in phase with the voltage of said second source when said bridge is unbalanced in a first direction, the phase of said output voltage reversing with reversal in the direction of said unbalance, a motor having windings rotatedly spaced 90 electrical degrees, means connecting one of said windings with said output voltage to provide reversible energization of said winding, means connecting a second of said windings with said second source to provide voltage for energizing said second winding, said last named means including means introducing a phase angle of 90 degrees between said energizing voltage and the voltage of said second source, whereby to cause reversible operation of said motor upon reversible unbalance of said bridge, and control means mechanically actuated by said motor.

5. In a device of the class described, a normally balanced impedance bridge, a first source of alternating voltage, of high frequency, means connecting said source with said bridge, means for causing unbalance of said bridge in response to change in condition, means varying the impedance of an arm of said bridge for effecting rebalance of said bridge, said bridge giving a signal voltage of said high frequency when unbalanced, said signal voltage being in phase with the voltage of said source when said bridge is unbalanced in a first direction, the phase of said signal voltage reversing with reversal in the direction of said unbalance, an electron discharge device having anode, cathode, and control elements, means connecting said elements in a plurality of input circuits and an output circuit, means impressing said signal voltage upon one of said input circuits, a second source of alternating voltage of a power frequency, means impressing, upon another of said input circuits, a second voltage of said power frequency and of a phase angle with respect to the voltage of said second source which is an integral multiple of 180 degrees, an output impedance member for said device, means connecting said member in said output circuit whereby discharge of said device through said member under the influence of said voltages impressed upon said input circuits may cause a voltage to appear across said member, said voltage being of said high frequency modulated by said power frequency to an extent determined by the unbalance of said bridge, means combining said voltage with a voltage from said first source, a demodulator, means impressing said combined output voltage of said power frequency when said bridge is unbalanced, said output voltage being in phase with the voltage of said second source when said bridge is unbalanced in a first direction, the phase of said output voltage reversing with reversal in the direction of said unbalance, a motor having windings rotatedly spaced 90 electrical degrees, means connecting one of said windings with said output voltage to provide reversible energization of said winding, means connecting a second of said windings with said second source to provide voltage for energizing said second winding, said last named means including means introducing a phase angle of 90 degrees between said energizing voltage and the voltage of said second source, whereby to cause reversible operation of said motor upon reversible unbalance of said bridge, condition control means mechanically actuated by said motor, and means mechanically connecting said motor and said rebalancing means, whereby operation of said motor actuated by said bridge unbalance may bring about rebalance of said bridge.

6. In a device of the class described, a normally balanced impedance bridge, a first source of alternating voltage, of high frequency, means connecting said source with said bridge, means for causing unbalance of said bridge in response to change in a condition, said bridge giving a signal voltage of said high frequency when unbalanced, said signal voltage being in phase with the voltage of said source when said bridge is unbalanced in a first direction, the phase of said signal voltage reversing with reversal in the direction of said unbalance, an electron discharge device having anode, cathode and control elements, means connecting said elements in a plurality of input circuits and an output circuit, means impressing said signal voltage upon one of said input circuits, a second source of alternating voltage of a power frequency, means impressing, upon another of said input circuits, a second voltage of said power frequency and of a phase angle with respect to the voltage of said second source which is an integral multiple of 180 degrees, an output impedance member for said device, means connecting said member in said output circuit whereby discharge of said device through said member under the influence of said voltages impressed upon said input circuits may cause a voltage to appear across said member, said voltage being of said high frequency modulated by said power frequency to an extent determined by the unbalance of said bridge, means combining said voltage with a voltage from said first source, a demodulator, means impressing said combined voltage upon said demodulator, means deriving from said demodulator an output voltage of said power frequency when said bridge is unbalanced, said output voltage being in phase with the voltage of said second source when said bridge is unbalanced in a first direction, the phase of said output voltage reversing with reversal in the direction of said unbalance, a motor, and means energizing said motor from said output voltage and from said second source.

7. In a device of the class described, a plurality of electron discharge means having a common anode circuit, means independently controlling the discharge of said means in accordance with a carrier frequency alternating voltage of fixed phase and with a signal voltage of said carrier frequency modulated at a power frequency, said carrier frequency voltage being of reversible phase, a reversible power frequency electrical unit, and means energizing said unit in accordance with the discharge of said discharge means.

8. An electronic motor control arrangement comprising, in combination, a reversible motor, a first source of alternating voltage of power frequency and fixed phase, a second source of alternating voltage of high frequency and fixed phase, means deriving from said second source a signal voltage of said high frequency and reversible in phase with respect thereto, and means for supplying said motor with energizing voltage which is of said power frequency and which reverses in phase with phase reversal of said signal voltage, said last named means comprising electron discharge means having anode, cathode, and control elements, means connecting said elements in a plurality of input circuits and an output circuit, means impressing voltage from said first source upon one of said input circuits, and means impressing said signal voltage upon another of said input circuits.

9. An electronic motor control arrangement comprising, in combination, a reversible motor, a first source of alternating voltage of power frequency and fixed phase, a second source of alternating voltage of high frequency and fixed phase, means deriving from said second source a signal voltage of said high frequency and reversible in phase with respect thereto, and means for supplying said motor with energizing voltage which is of said power frequency and which reverses in phase with phase reversal of said signal voltage, said last named means comprising electron discharge means having anode, cathode, and control elements, means connecting said elements in a plurality of input circuits and an output circuit, means impressing voltage from said first source upon one of said input circuits, and means impressing said signal voltage upon another of said input circuits, and means impressing voltage from said second source upon another of said input circuits.

10. In a device of the class described, in combination, temperature responsive means, a normally balanced electric bridge having a plurality of impedance members, means associating said responsive means with one of said members for varying the impedance thereof, whereby to unbalance said bridge, a high frequency oscillator energizing said bridge, a source of alternating voltage of relatively low frequency, a reversible low frequency motor, condition regulating means actuated by said motor, an amplifier, and means energizing said motor from said source under the control of said amplifier, means associating said motor with said bridge, said last named means comprising an electron discharge device having an output circuit and a plurality of control electrodes, means connecting said electrodes with said oscillator, said bridge, and said source, and means connecting said amplifier in said output circuit.

11. In a device of the class described, in combination, condition responsive means, a normally balanced electric bridge having a plurality of variable impedance members, means associating said responsive means with one of said members for varying the impedance thereof, whereby to unbalance said bridge, a high frequency oscillator energizing said bridge, a source of alternating voltage of relatively low frequency, a reversible low frequency motor, an amplifier, means associating said motor with one of said impedance members for varying the impedance thereof, whereby operation of the motor may rebalance the bridge, and means energizing said motor from said source under the control of said amplifier, said last named means comprising an electron discharge device having an output circuit and a plurality of control electrodes, means connecting said electrodes with said oscillator, said bridge, and said source, and means connecting said amplifier in said output circuit.

12. A device of the class described comprising, in combination, an impedance bridge, means energizing said bridge with alternating voltage of a carrier frequency, a source of alternating voltage of a power frequency, a reversible motor designed for energization with alternating voltage of said power frequency, an amplifier, and means energizing said motor with alternating voltage from said source under the control of said amplifier, said last named means comprising an electron discharge device having an output circuit and a plurality of control elements, means severally connecting said first named means, said bridge, and said source to said control elements, means connecting said amplifier in said output circuit, and means connecting said motor with said source and said amplifier for joint energization thereby.

13. In an electrical circuit arrangement of the character described, in combination: electron discharge means comprising electron emissive cathode means and a plurality of other electrodes; a source of high frequency voltage; a normally balanced impedance network including variable impedance means for affecting the balance thereof; means energizing said network from said source to give a network voltage of said frequency which reverses in phase with reversal in the sense of the unbalance of said network; a source of low frequency voltage; means impressing said network voltage and voltages from said sources between said cathode means and said other electrodes, to control the discharge of said discharge means; and means responsive to the discharge thereof.

14. In an electrical circuit arrangement of the character described, in combination: electron discharge means comprising electron emissive cathode means and a plurality of other electrodes; a source of high frequency voltage; a normally balanced impedance network including variable impedance means for affecting the balance thereof; means energizing said network from said source to give a network voltage of said frequency which reverses in phase with reversal in the sense of the unbalance of said network; a source of low frequency voltage; means impressing said network voltage and voltages from said sources between said cathode means and said other electrodes, to control the discharge of said discharge means; a low frequency reversible motor; and means electrically connecting said motor to said discharge means in such a manner as to cause operation of said motor in a direction dependent upon the sense of unbalance of said network.

15. In an electrical circuit arrangement of the character described, in combination: electron discharge means comprising electron emissive cathode means and a plurality of other electrodes; a source of high frequency voltage; a normally balanced impedance network including variable impedance means for affecting the balance thereof; means energizing said network from said source to give a network voltage of said frequency which reverses in phase with reversal in the sense of the unbalance of said network; a source of low frequency voltage; means impressing said network voltage and voltages from said sources between said cathode means and said other electrodes, to control the discharge of said discharge means; a low frequency reversible motor; means electrically connecting said motor to said discharge means in such a manner as to cause operation of said motor in a direction dependent on the sense of unbalance of said network; and means operated by said motor for varying said variable impedance means upon unbalance of said normally balanced impedance network to rebalance said network.

16. In a device of the class described, a normally balanced impedance bridge, a first source of alternating voltage, of high frequency, means connecting said source with said bridge, means for causing unbalance of said bridge in response to change in a condition, means varying the impedance of an arm of said bridge for effecting rebalance of said bridge, said bridge giving a signal voltage of said high frequency when unbalanced, said signal voltage being in phase with the voltage of said source when said bridge is unbalanced in a first direction, the phase of said signal voltage reversing with reversal in the direction of said unbalance, an electron discharge device having anode, cathode and control elements, means connecting said elements in a plurality of input circuits and an output circuit, means impressing said signal voltage upon one of said input circuits, a second source of alternating voltage of a power frequency, means impressing, upon another of said input circuits, a second voltage of said power frequency, an output impedance member for said device, means connecting said member in said output circuit whereby discharge of said device through said member under the influence of said voltages impressed upon said input circuits may cause a voltage to appear across said member, said voltage being of said high frequency modulated by said power frequency to an extent determined by the unbalance of said bridge, means combining said voltage with a voltage from said first source, a demodulator, means impressing said combined voltage upon said demodulator, means deriving from said demodulator an output voltage of said power frequency when said bridge is unbalanced, said output voltage being in phase with the voltage of said second source when said bridge is unbalanced in a first direction, the phase of said output voltage reversing with reversal in the direction of said unbalance, a motor having windings rotatedly spaced 90 electrical degrees, means connecting one of said windings with said output voltage to provide reversible energization of said winding, means connecting a second of said windings with said second source to provide voltage for energizing said second winding, said last named means including means introducing a phase angle of 90 degrees between said energizing voltage and the voltage of said second source, whereby to cause reversible operation of said motor upon reversible unbalance of said bridge, condition control means mechanically actuated by said motor, and means mechanically connecting said motor and said rebalancing means, whereby operation of said motor actuated by said bridge unbalance may bring about rebalance of said bridge.

17. In a device of the class described, a normally balanced impedance bridge, a first source of alternating voltage, of high frequency, means connecting said source with said bridge, means for causing unbalance of said bridge in response to change in a condition, means varying the impedance of an arm of said bridge for effecting rebalance of said bridge, said bridge giving a signal voltage of said high frequency when unbalanced, said signal voltage being in phase with the voltage of said source when said bridge is unbalanced in a first direction, the phase of said signal voltage reversing with reversal in the direction of said unbalance, an electron discharge device having anode, cathode and control elements, means connecting said elements in a plurality of input circuits and an output circuit, means impressing said signal voltage upon one of said input circuits, a second source of alternating voltage of a power frequency, means impressing, upon another of said input circuits, a second voltage of said power frequency and of a phase angle with respect to the voltage of said second source which is an integral multiple of 180 degrees, an output impedance member for said device, means connecting said member in said output circuit whereby discharge of said device through said member under the influence of said voltages impressed upon said input circuits may cause a voltage to appear across said member, said voltage being of said high frequency modulated by said power frequency to an extent determined by the unbalance of said bridge, means combining said voltage with a voltage from said first source, a demodulator and means impressing said combined voltage upon said demodulator, means deriving from said demodulator an output voltage of said power frequency when said bridge is unbalanced, said output voltage being in phase with the voltage of said second source when said bridge is unbalanced in a first direction, the phase of said output voltage reversing with reversal in the direction of said unbalance.

18. A balanceable impedance bridge having at least one arm of adjustable impedance; means energizing said bridge with alternating voltage of constant magnitude and phase and of relatively high frequency, so that adjustment of said adjustable impedance arm varies the magnitude of a high frequency output voltage supplied by said bridge; a translating circuit including asymmetrically conducting means; means applying thereto a single high frequency voltage having at least a component determined by said bridge output; means in said translating circuit, including said asymmetrically conducting means, for producing a low frequency output dependent in magnitude upon the magnitude of said bridge output voltage and in sense on the relation between said bridge output voltage and a comparison voltage; a reversible motor designed for operation by alternating voltage of said low frequency; and energizing means for said motor, including electrical connections to said translating circuit, for causing operation of said motor in opposite directions as the output of said translation circuit reverses in sense.

19. A first source of alternating voltage of a selected high frequency and of variable amplitude, and a second source of voltage of said high frequency and of fixed amplitude, at least one of said voltages being modulated at a selected low frequency; a load impedance; and a translating circuit energizing said load impedance, in accordance with the relation between said high frequency voltages, with reversible voltage of said low frequency; said translating circuit including a demodulating component and a voltage combining component, means energizing one of said components with said high frequency voltages, means energizing the other of said components from said first component, and means energizing said load impedance from said other of said components.

20. A first source of alternating voltage, of a selected high frequency and of variable amplitude, and a second source of voltage of said high frequency and of fixed amplitude, at least one of said voltages being modulated at a selected low frequency; a load impedance; a translating circuit energizing said load impedance, in accordance with the relation between said high frequency voltages, with reversible voltage of said low frequency; said translating circuit including a demodulating component and a voltage combining component, means energizing one of said components with said high frequency voltages, means energizing the other of said components from said first component, and means energizing said load impedance from said other of said components; a low frequency motor; means energizing said motor from said load impedance; means actuated by said motor for reducing the degree of energization of said load impedance from said translation circuit, and indicating means driven by said motor.

WALDO H. KLIEVER.

REFERENCES CITED

The following references are of record in the file of this patent:

UNITED STATES PATENTS

| Number | Name | Date |
| --- | --- | --- |
| 2,183,725 | Seeley | Dec. 19, 1939 |
| 2,203,689 | MacDonald | June 11, 1940 |
| 2,226,288 | Pieplow | Dec. 24, 1940 |
| 2,303,654 | Newton | Dec. 1, 1942 |
| 2,436,807 | Isbister | Mar. 2, 1948 |

Certificate of Correction

Patent No. 2,476,496

July 19, 1949

WALDO H. KLIEVER

It is hereby certified that errors appear in the printed specification of the above numbered patent requiring correction as follows:

Column 2, line 6, beginning with the words "in the range" strike out all to and including "communication" in line 8, and insert the same in line 6, after "frequency", first occurrence, and before the comma; column 9, line 8, for "sid" read *said*;

and that the said Letters Patent should be read with these corrections therein that the same may conform to the record of the case in the Patent Office.

Signed and sealed this 25th day of April, A. D. 1950.

[SEAL]

THOMAS F. MURPHY,
*Assistant Commissioner of Patents.*